US011945261B2

(12) United States Patent
Nakamura

(10) Patent No.: US 11,945,261 B2
(45) Date of Patent: Apr. 2, 2024

(54) TIRE

(71) Applicant: BRIDGESTONE CORPORATION, Tokyo (JP)

(72) Inventor: Takamitsu Nakamura, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 364 days.

(21) Appl. No.: 17/421,634

(22) PCT Filed: Dec. 11, 2019

(86) PCT No.: PCT/JP2019/048482
§ 371 (c)(1),
(2) Date: Jul. 8, 2021

(87) PCT Pub. No.: WO2020/166188
PCT Pub. Date: Aug. 20, 2020

(65) Prior Publication Data
US 2022/0072910 A1 Mar. 10, 2022

(30) Foreign Application Priority Data
Feb. 14, 2019 (JP) ................... 2019-024595

(51) Int. Cl.
*B60C 11/03* (2006.01)
*B60C 11/12* (2006.01)

(52) U.S. Cl.
CPC ...... *B60C 11/0304* (2013.01); *B60C 11/1236* (2013.01); *B60C 2011/0358* (2013.01)

(58) Field of Classification Search
CPC ..... B60C 2011/0341; B60C 2011/0348; B60C 2011/0365; B60C 11/0306;
(Continued)

(56) References Cited

U.S. PATENT DOCUMENTS 10,308,077 B2   6/2019 Hayashi
10,377,184 B2   8/2019 Nagase
(Continued)

FOREIGN PATENT DOCUMENTS

CN   106347034 A   1/2017
CN   106660407 A   5/2017
(Continued)

OTHER PUBLICATIONS

Extended European Search Report dated Sep. 23, 2022 from the European Patent Office in EP Application No. 19915112.7.
(Continued)

*Primary Examiner* — Justin R Fischer
*Assistant Examiner* — Wendy L Boss
(74) *Attorney, Agent, or Firm* — Sughrue Mion, PLLC

(57) ABSTRACT

Provided is a tire including, in a surface of a tread of the tire, a land portion row in which four land portions are arranged in parallel in a width direction of the tread, in a land portion on one end side of the land portion row, a recess that opens in a circumferential groove on an adjacent land portion side, and an intermittent sipe extending in an orientation intersecting the width direction of the tread, intermittently by being interrupted by the circumferential groove, from a position of a start end corresponding to the recess, across three land portions of the four land portions excluding the land portion on the one end side, wherein the intermittent sipe opens in a surface of each of the three land portions via an inclined surface from the surface of each of the three land portions toward the intermittent sipe.

10 Claims, 3 Drawing Sheets

(58) Field of Classification Search
CPC ............. B60C 11/0304; B60C 11/1236; B60C 11/1392; B60C 2011/0381
See application file for complete search history.

(56) References Cited

U.S. PATENT DOCUMENTS

| | | | |
|---|---|---|---|
| 10,384,491 B2 | 8/2019 | Takemoto | |
| 2011/0005653 A1* | 1/2011 | Ebiko | B60C 11/12 152/209.18 |
| 2016/0082780 A1* | 3/2016 | Nagahara | B60C 11/042 152/209.18 |
| 2016/0152094 A1 | 6/2016 | Kagimoto | |
| 2016/0236517 A1 | 8/2016 | Nagase | |
| 2017/0015143 A1* | 1/2017 | Nagase | B60C 11/1272 |
| 2017/0253089 A1 | 9/2017 | Hayashi | |
| 2018/0215203 A1 | 8/2018 | Kuriyama | |
| 2019/0001753 A1* | 1/2019 | Hayashi | B60C 11/0304 |
| 2019/0193473 A1* | 6/2019 | Shinzawa | B60C 5/00 |

FOREIGN PATENT DOCUMENTS

| | | |
|---|---|---|
| CN | 107031298 A | 8/2017 |
| JP | 2014-531365 A | 11/2014 |
| JP | 2016-7973 A | 1/2016 |
| JP | 2016-49879 A | 4/2016 |
| JP | 2016-150601 A | 8/2016 |
| JP | 2016-168911 A | 9/2016 |
| JP | 2017-24454 A | 2/2017 |
| JP | 2018-111450 A | 7/2018 |
| JP | 2018-154188 A | 10/2018 |
| WO | 2013/048682 A1 | 4/2013 |
| WO | 2014/037165 A1 | 3/2014 |

OTHER PUBLICATIONS

Communication dated Mar. 22, 2023, from the Chinese Patent Office in Application No. 201980091536.X.
Office Action dated Oct. 8, 2022 issued in Chinese Application No. 201980091536.X.
International Preliminary Report on Patentability with translation of Written opinion dated Aug. 10, 2021, in International Application No. PCT/JP2019/048482.
International search report for PCT/JP2019/048482 dated Mar. 10, 2019.

* cited by examiner

TIRE

CROSS-REFERENCE TO RELATED APPLICATIONS

This application is a National Stage of International Application No. PCT/JP2019/048482 filed Dec. 11, 2019, which claims priority under U.S.C. § 119(a) to Japanese Patent Application No. 2019-024595 filed on Feb. 14, 2019.

TECHNICAL FIELD

The present disclosure relates to a tire, more particularly to a tire having steering stability on a wet road surface that is enhanced by improving drainage performance.

BACKGROUND

A tire might slip due to decrease in footprint area of a tread surface, in a case where water film is present between the tread surface and a road surface during driving on the road surface that is wetted, for example, when it rains. To prevent the tire from slipping, in general, drainage performance in a tread ground contact region is acquired by providing, in the tread surface of the tire, a circumferential groove extending along a tire equator.

Furthermore, it is known that from a viewpoint of improvement in drainage performance, a so-called sipe that is a notched narrow groove is provided in a land portion such as a rib or a block defined by the circumferential groove or the like.

For example, in PTL 1, a tire is disclosed in which a plurality of sipes are provided in a rib, to improve drainage performance.

CITATION LIST

Patent Literature

PTL 1: Japanese Patent Laid-Open No. 2018-111450

SUMMARY

Technical Problem

In a tire disclosed in PTL 1, a plurality of sipes extending in a tread width direction are provided in a rib, and additionally, some of the sipes include a chamfered portion in an opening edge of the sipe with the intention of further improvement in drainage performance. Thus, the chamfered portion is provided in the opening edge of the sipe, to provide the chamfered portion with a function of a drainage path.

In the tire disclosed in PTL 1, however, water taken into the sipes might be insufficiently discharged.

To solve the above problem, an object of the present disclosure is to provide a tire having an improved drainage performance in a tread ground contact region.

Solution to Problem

The present inventors have earnestly investigated means for achieving the above object. As a result, it has been newly found that drainage performance obtainable by a sipe is further improved by providing the sipe with continuity across a plurality of land portions, and the present disclosure has been completed.

The summary of the present disclosure is as follows.

A tire of the present disclosure includes, in a surface of a tread of the tire, a land portion row in which four land portions each defined by circumferential grooves extending in a circumferential direction of the tread or by a circumferential groove and a tread edge are arranged in parallel in a width direction of the tread, in a land portion on one end side of the land portion row, a recess that opens in the circumferential groove on an adjacent land portion side, and an intermittent sipe extending in an orientation intersecting the width direction of the tread, intermittently by being interrupted by the circumferential groove, from a position of a start end corresponding to the recess, across three land portions of the four land portions excluding the land portion on the one end side, wherein the intermittent sipe opens in a surface of each of the three land portions via an inclined surface from the surface of each of the three land portions toward the intermittent sipe.

Here, "the tread surface" means an outer circumferential surface over an entire circumference of the tire that comes in contact with a road surface when the tire assembled to a rim and charged with a predetermined internal pressure is rolled in a state where the tire is loaded with a maximum load, and "the tread edge" means an edge of the tread surface in a tire width direction.

The above "rim" indicates an approved rim (a measuring rim in Standards Manual of ETRTO, and a design rim in Year Book of TRA) in an applicable size described or to be described in future in an industrial standard effective in a region where the tire is produced and used, for example, JATMA Year Book of JATMA (the Japan Automobile Tyre Manufacturers Association) in Japan, Standards Manual of ETRTO (the European Tyre and Rim Technical Organization) in Europe, Year Book of TRA (the Tire and Rim Association, Inc.) in U.S. or the like (i.e., the above "rim" also includes a rim having a size that may be included in the above industrial standard in future, in addition to the existing size. Examples of "the size to be described in future" can include sizes described as "future developments" in 2013 edition of Standards Manual of ETRTO). However, it is considered that a rim having a size that is not described in the above industrial standard refers to a rim having a width corresponding to a bead width of the tire. Furthermore, "the predetermined internal pressure" refers to an air pressure (a maximum air pressure) corresponding to a maximum load capability of a single wheel in an applicable size and ply rating described in JATMA Year Book described above, or the like. The "predetermined internal pressure" for a tire having a size that is not described in the above industrial standard refers to an air pressure (the maximum air pressure) corresponding to the maximum load capability prescribed for each vehicle to which the tire is mounted. Additionally, "the maximum load" refers to a load corresponding to the above maximum load capability. Note that air referred to herein can be replaced with inert gas such as nitrogen gas or the like.

Note that the sipe "extending intermittently by being interrupted by the circumferential groove" indicates a state where a series of sipes, i.e., sipes extending in a row is divided by the circumferential groove defining the land portion, and this state does not include a case where the sipe is divided into a plurality of sipes in a land portion. It is important that the sipe is continuous in a land portion.

Advantageous Effect

According to the present disclosure, a tire having an improved drainage performance in a tread ground contact region can be provided.

DETAILED DESCRIPTION

Hereinafter, an embodiment of a tire of the present disclosure will be illustrated and described in detail with reference to the drawings.

Figure 1:
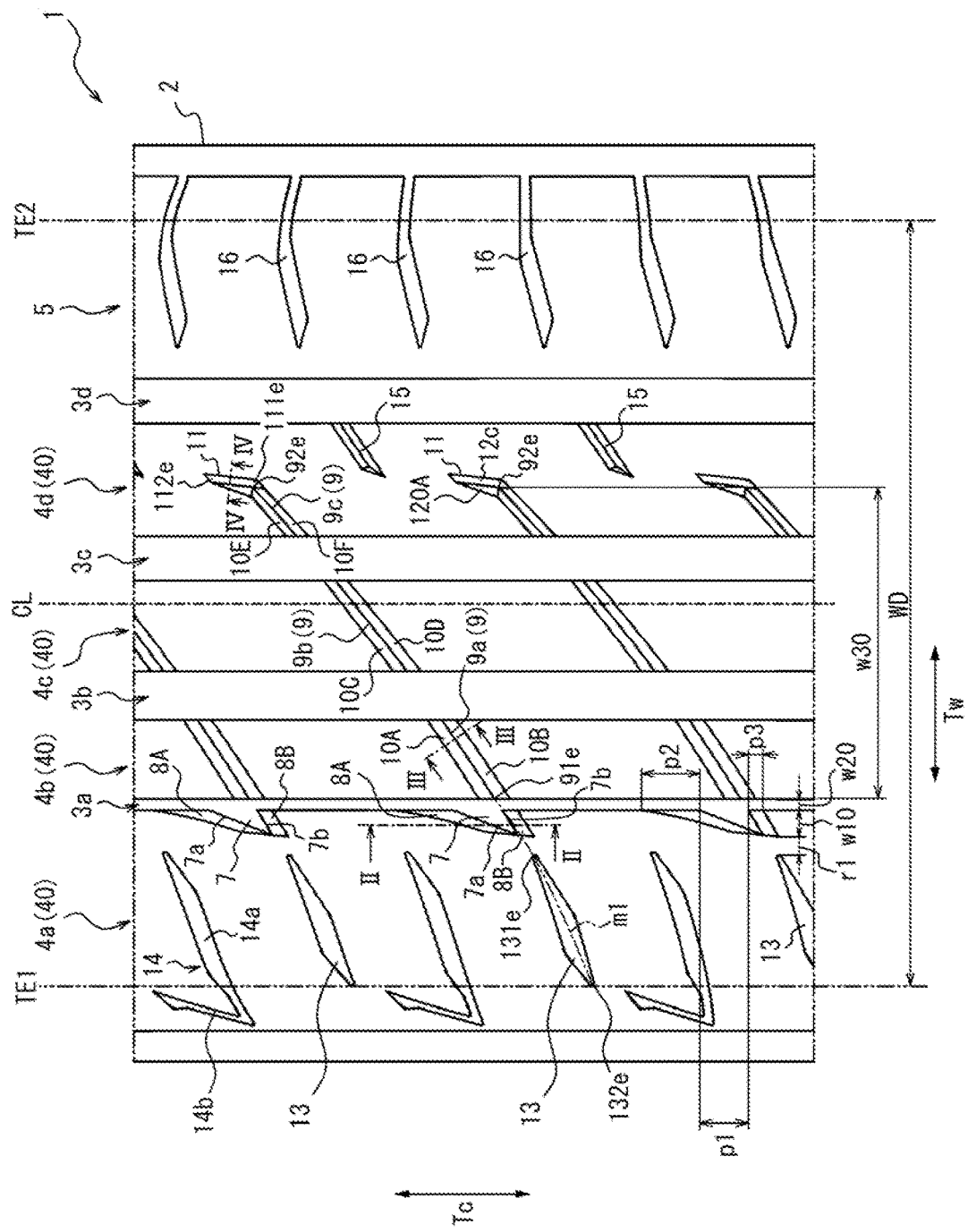
FIG. 1 is a developed view of a part of a tread surface of a tire according to an embodiment of the present disclosure.
Figure 2:
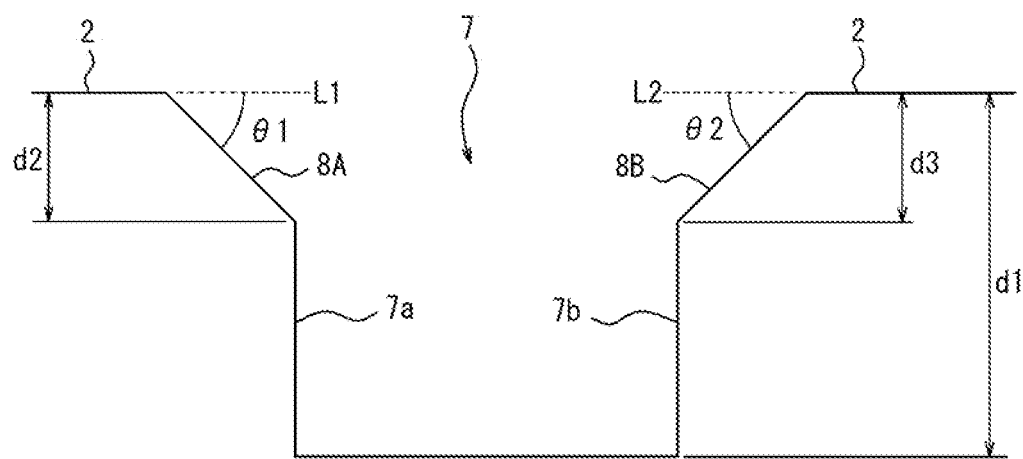
FIG. 2 is a view illustrating a cross section along line II-II of FIG. 1.

FIG. 1 illustrates a part of a tread surface 2 of a tire 1 according to the embodiment of the present disclosure in a developed manner in a tread width direction, and FIG. 2 illustrates a cross section along line II-II of FIG. 1. Note that in an illustrated example, CL denotes a tire equator, Tc denotes a tread circumferential direction, and Tw denotes the tread width direction.

Note that although not illustrated in the drawings, the tire 1 includes a carcass as a frame across a pair of bead portions, and includes a pair of sidewall portions outside the bead portions in a tire radial direction, and a tread across the sidewall portions.

The tire 1 includes, in the tread surface 2, a land portion row 40 in which four land portions each defined by circumferential grooves extending in a circumferential direction of the tread or by a circumferential groove and a tread edge are arranged in parallel in the tread width direction, the land portions being, in the illustrated example, four land portions 4a, 4b, 4c and 4d defined by circumferential grooves 3a, 3b, 3c and 3d and a tread edge TE1. Note that in FIG. 1, a land portion 5 defined by the circumferential groove 3d and a tread edge TE2 is disposed adjacent to the land portion 4d.

Here, in the land portion 4a on one end side of the land portion row 40, a recess 7 that opens in the circumferential groove 3a on an adjacent land portion 4b side is formed. In the illustrated example, the recess 7 is defined by side walls 7a and 7b, and the land portion 4a is formed to be recessed inward in the tread width direction. FIG. 1 illustrates the recess 7 in a shape in which the side walls 7a and 7b open in a substantially V-shape from an interior of the land portion 4a toward the circumferential groove 3a. There are not any special restrictions on the shape. For example, the shape may be a shape that opens in a substantially polygonal shape or opens in a semicircular shape in developed view of the tread surface. From an after-mentioned viewpoint of controlling water flow to improve drainage performance, it is preferable that the recess is formed in the illustrated shape or the substantially polygonal shape.

According to the above configuration, the recess 7 opens in the circumferential groove 3a, and the recess 7 communicates with the circumferential groove 3a, so that an area of the circumferential groove 3a in the tread surface can be increased. Therefore, more water on a road surface can be taken inside and discharged, and the drainage performance can be improved.

Note that a depth d1 of the recess 7 is preferably similar to a depth of the circumferential groove 3a, because the recess 7 communicates and unites with the circumferential groove 3a to contribute to the improvement in drainage performance, but there are not any special restrictions on the depth. Note that the depth d1 of the recess 7 indicates a maximum depth of the recess 7, and a groove depth d10 of the circumferential groove 3a indicates a maximum depth of the circumferential groove 3a.

Also, there are not any special restrictions on a maximum length p1 of the recess 7 in the tread circumferential direction, and it is preferable that the maximum length is larger than a groove width w1 of an after-mentioned intermittent sipe 9. For example, the maximum length may be from 110% to 200% of the groove width w1.

Furthermore, it is preferable that a maximum length w10 of the recess 7 in the tread width direction is from 120% to 300% of a groove width w20 of the circumferential groove 3a. Drainage performance in the tread surface can be sufficiently improved by setting a ratio of the maximum length w10 to the groove width w20 of the circumferential groove 3a to 120% or more, and rigidity of the land portion 4a can be maintained by setting the ratio to 300% or less.

Also, in the present embodiment, it is preferable that the side walls 7a and 7b defining the recess 7 include a surface inclined from a surface of the land portion 4a toward a bottom portion of the circumferential groove 3a. As illustrated in FIG. 2, the side wall 7a of the recess 7 includes an inclined surface 8A having an inclined shape with a depth gradually increasing inward from the surface of the land portion 4a toward the bottom portion of the circumferential groove 3a in the tire radial direction, and the side wall 7b includes an inclined surface 8B having an inclined shape with a depth gradually increasing inward from the surface of the land portion 4a toward the bottom portion of the circumferential groove 3a in the tire radial direction.

According to the above configuration, water can be more efficiently taken from the surface of the land portion 4a toward the recess 7 along inclination of the inclined surfaces 8A and 8B, and water can be more efficiently discharged from the recess 7 toward the surface of the land portion 4a along the inclination of the inclined surfaces 8A and 8B.

Note that each of depths d2 and d3 of the inclined surfaces 8A and 8B is preferably from 10% to 70% of the depth d1 of the recess 7. Note that the depths of the inclined surfaces 8A and 8B indicate maximum depths of the inclined surfaces 8A and 8B, respectively. The drainage performance can be efficiently improved by setting each of the depths d2 and d3 to 10% or more of the depth d1 of the recess 7, and decrease in rigidity around the recess 7 can be prevented by setting this ratio to 70% or less.

Note that in the surface of the land portion 4a, each of an angle θ1 formed by a tangent L1 in a boundary between the inclined surface 8A and the surface of the land portion 4a, and the inclined surface 8A and an angle θ2 formed by a tangent L2 in a boundary between the inclined surface 8B and the surface of the land portion 4a, and the inclined surface 8B is preferably 5° to 70°. Contribution to improvement in drainage performance of the recess 7 can be sufficiently made by setting each of the angles θ1 and θ2 to 5° or more, and a grounding property of the land portion with the road surface can be maintained by setting the angle to 70° or less.

Note that maximum lengths p2 and p3 of the inclined surfaces 8A and 8B in the tread circumferential direction may be different lengths. Also, it is preferable that each of the maximum lengths p2 and p3 is from 25% to 150% of the maximum length p1 of the recess 7. The contribution to the improvement in drainage performance of the recess 7 can be sufficiently made by setting a ratio of each length to the maximum length p1 of the recess 7 to 25% or more, and decrease in rigidity of the land portion 4a can be prevented by setting the ratio to 150% or less.

Here, three land portions 4b, 4c and 4d are arranged in order, adjacent to the land portion 4a on the one end side. In the land portions 4b, 4c and 4d, provided is the intermittent sipe 9 extending in an orientation intersecting the tread width direction, intermittently by being interrupted by the circumferential grooves 3b and 3c, from a position of a start end corresponding to the recess 7, across the land portions 4b, 4c and 4d. Here, extending from the position of the start end corresponding to the recess 7 indicates that a start end 91e of the intermittent sipe 9 is located in a region where the recess 7 is disposed in the tread circumferential direction. The intermittent sipe 9 opens in the circumferential groove 3a in the start end 91e, and smoothly extends in a row, crossing the land portions 4b and 4c, to the land portion 4d. In the illustrated example, in the intermittent sipe 9, a portion extending in the land portion 4b is illustrated as a small sipe 9a, a portion extending in the land portion 4c is illustrated as a small sipe 9b, and a portion extending in the land portion 4d is illustrated as a small sipe 9c. The small sipes 9a, 9b and 9c smoothly and integrally extend via the circumferential grooves 3b and 3c.

According to the above configuration, the sipe can exert the drainage performance with continuity across the plurality of land portions. That is, water taken into the respective small sipes 9a, 9b and 9c can cross the plurality of land portions along the intermittent sipe 9, and flow of water flowing inside from the adjacent small sipe among the small sipes 9a, 9b and 9c promotes water flow in the sipe without a hitch, and promotes water flow from the sipe to the communicating circumferential groove. Then, when water flows from the intermittent sipe 9 into the recess 7 located at the corresponding position through the circumferential groove 3a, water flows backward along the shape of the recess 7 to an intermittent sipe 9 side, and water is discharged from the recess 7 to outside the tread surface 2 or to the surface of the land portion. Alternatively, water flowing backward in the circumferential groove 3a collides with water flowing from the intermittent sipe 9 into the groove, and water is discharged from the circumferential groove 3a to outside the tread surface 2. Thus, the intermittent sipe 9 and the recess 7 can control the flow of water to further promote discharge of water with continuity across the plurality of land portions.

Note that at least a part of the side wall defining the recess 7 is preferably present on an extension line of the intermittent sipe 9. That is, in the illustrated example, the side wall 7b defining the recess 7 is present on an extension line ml that is a virtual line extending along an extending orientation of the intermittent sipe 9. According to the above configuration, integrity of the intermittent sipe 9 and the recess 7 further enhances, and the drainage performance can further improve.

Note that in the illustrated example, the intermittent sipe 9 extends while being slightly curved to draw a large arc, however, there are not any special restrictions on a shape of the sipe as long as the sipe smoothly extends in a row. The sipe may linearly extend.

Also, the intermittent sipe 9 may extend in the orientation intersecting the tread width direction, from a viewpoint of discharging water to the communicating circumferential groove, i.e., the circumferential grooves 3a, 3b and 3c in the illustrated example, and there are not any special restrictions on an inclination angle.

Further, in the illustrated example, the intermittent sipe 9 terminates in the land portion 4d, and there are not any special restrictions on a position of a terminal 92e. The sipe 9c may cross the land portion 4d.

Note that a length w30 of the intermittent sipe 9 from the start end 91e to the terminal 92e in the tread width direction is preferably from 30% to 80% of a length WD of the tread surface 2 in the tread width direction. The drainage performance in the tread surface can be sufficiently improved by setting a ratio of the length w30 in the tread width direction to the length WD in the tread width direction to 30% or more, and the rigidity of the tread surface 2 can be maintained by setting the ratio to 80% or less.

The intermittent sipe 9 extends with the groove width w1 being constant, but may have, for example, another shape with a groove width gradually increasing or gradually decreasing from the start end 91e to the terminal 92e.

Note that here, "the groove width" refers to a groove width in a cross section orthogonal to an extending direction of the intermittent sipe 9. It is preferable that the groove width w1 is from 0.1 mm to 1.0 mm.

Furthermore, the intermittent sipe 9 extends with a constant groove depth d4, but may have, for example, another shape with a groove depth gradually increasing or gradually decreasing from the start end 91e to the terminal 92e.

Note that here, "the groove depth" refers to a maximum depth of the intermittent sipe 9. It is preferable that the groove depth d4 is from 2.0 mm to 8.0 mm.

Note that a plurality of intermittent sipes 9 and recesses 7 each configured to be continuous as described above are preferably arranged at regular intervals in the tread circumferential direction as illustrated in the drawing. For example, it is preferable that 20 or more sets of the intermittent sipe 9 and the recess 7 are arranged in an entire circumference of the tread surface 2.

Also, the intermittent sipe 9 opens in respective surfaces of the three land portions 4b, 4c and 4d via inclined surfaces from the respective surfaces of the three land portions 4b, 4c and 4d toward the intermittent sipe 9. In the illustrated example, inclined surfaces 10A, 10B, 10C, 10D, 10E and 10F inclined inward in the tire radial direction are provided from the respective surfaces of the land portions 4b, 4c and 4d toward the intermittent sipe 9.

Figure 3:
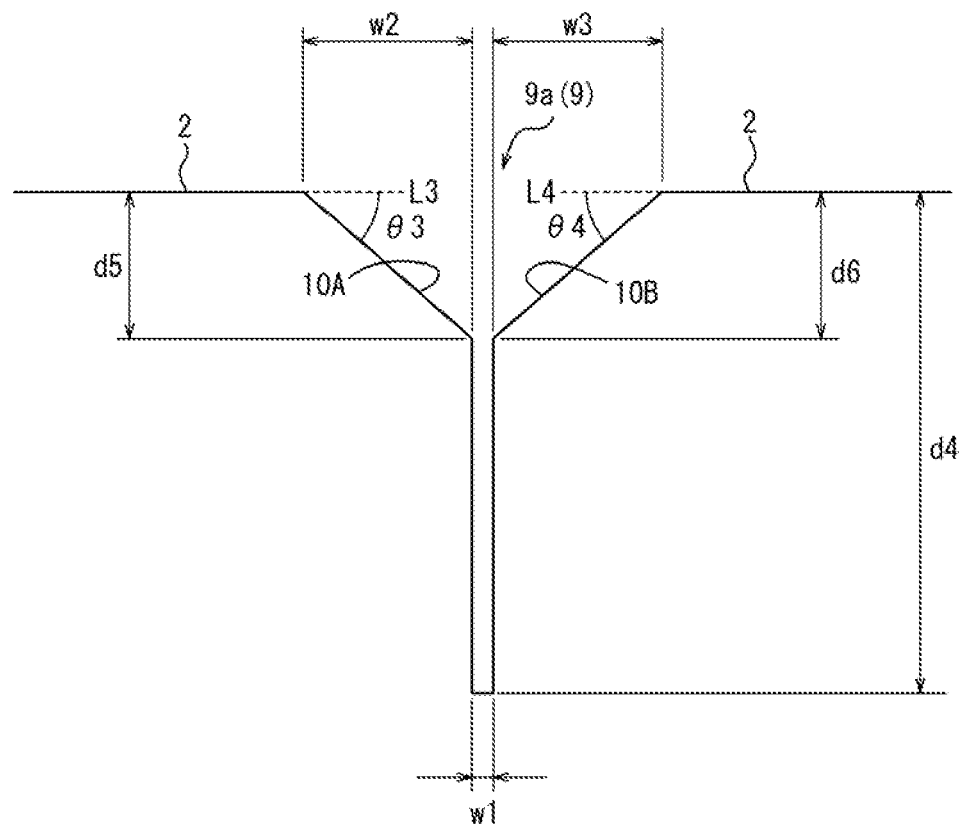
FIG. 3 is a view illustrating a cross section along line III-III of FIG. 1.

Description will be made as to the above inclined surface with reference to the inclined surfaces 10A and 10B as typical examples. FIG. 3 illustrates a cross section along line III-III of FIG. 1, the cross section being orthogonal to the extending direction of the intermittent sipe 9. As illustrated in the drawing, the inclined surfaces 10A and 10B have an inclined shape with a depth in the tire radial direction that gradually increases from the surface of the land portion 4b toward the intermittent sipe 9. The inclined surfaces 10A and 10B face each other via the intermittent sipe 9, thereby forming a substantially V-shaped space. Through the space formed in this manner, water can be effectively taken into the intermittent sipe 9. Furthermore, when a vehicle is braked or accelerated, an opening end edge of the sipe in a contact patch is easy to deform to be turned up, but the intermittent sipe 9 opens in the surface of the land portion via the inclined surface, so that such deformation can be prevented. Consequently, drainage performance in a tread ground contact region can be further improved. Also, since the deformation of the intermittent sipe 9 is prevented, deterioration of a grounding property of the land portion 4b due to deformation of the land portion 4b can be eventually inhibited.

As illustrated in FIG. 1, it is preferable that the inclined surfaces 10A, 10C and 10E extend from the position of the start end corresponding to the recess 7 along the extending orientation of the intermittent sipe 9 intermittently across the three land portions 4b, 4c and 4d, and it is similarly preferable that the inclined surfaces 10B, 10D and 10F similarly intermittently extend across the land portions 4b, 4c and 4d. According to the above configuration, water can be more efficiently taken into the intermittent sipe 9, and the taken water can more efficiently cross the plurality of land portions along the intermittent sipe 9. Therefore, water flow can be more efficiently controlled along the intermittent sipe 9, and the discharge of water can be further promoted.

Note that the inclined surfaces 10A and 10B have maximum lengths w2 and w3 in an orientation orthogonal to the intermittent sipe 9, respectively. The maximum lengths w2 and w3 may be constant from the start end 91e to the terminal 92e, but preferably gradually decrease. Water can be efficiently discharged from the intermittent sipe 9 to a recess 7 side as described later, by further increasing the maximum length w2 on a start end 91e side close to the recess 7.

It is also preferable that each of the maximum lengths w2 and w3 of the inclined surfaces 10A and 10B is from 300% to 1600% of the groove width w1 of the intermittent sipe 9. The drainage performance can be efficiently improved by setting a ratio of each of the maximum lengths w2 and w3 to the groove width w1 to 300% or more, and the deformation of the intermittent sipe can be sufficiently inhibited by setting the ratio to 1600% or less.

Furthermore, the inclined surfaces 10A and 10B extend with constant depths d5 and d6, but may have, for example, another shape with a depth gradually increasing or gradually decreasing from the start end 91e to the terminal 92e. Also, in the illustrated example, the depths d5 and d6 of the inclined surfaces 10A and 10B are the same, but the respective inclined surfaces may have different depths.

Note that here, "the depth" of the inclined surface indicates the maximum depth of the inclined surface.

It is preferable that each of the depths d5 and d6 of the inclined surfaces 10A and 10B is from 10% to 50% of the groove depth d4 of the intermittent sipe 9. The drainage performance can be efficiently improved by setting a ratio of each of the depths d5 and d6 to the groove depth d4 to 10% or more, and the deformation of the intermittent sipe 9 can be sufficiently inhibited by setting the ratio to 50% or less.

Note that in the surface of the land portion 4b, each of an angle θ3 formed by a tangent L3 in a boundary between the inclined surface 10A and the surface of the land portion 4b, and the inclined surface 10A and an angle θ4 formed by a tangent L4 in a boundary between the inclined surface 10B and the surface of the land portion 4b, and the inclined surface 10B is preferably 5° to 50°. Contribution to improvement in drainage performance of the intermittent sipe 9 can be sufficiently made by setting each of the angles θ3 and θ4 to 5° or more, and the grounding property of the land portion with the road surface can be maintained by setting the angle to 50° or less.

Here, as described above, there are not any special restrictions on the position of the terminal 92e of the intermittent sipe 9, and the intermittent sipe terminates in the land portion 4d in FIG. 1.

When the intermittent sipe 9 terminates in the land portion 4d, it is preferable to provide, in the land portion 4d, a circumferential narrow groove 11 extending from the terminal 92e of the intermittent sipe closer to the tread circumferential direction than to a direction of the intermittent sipe 9, and terminating in the land portion 4d. As illustrated in FIG. 1, the circumferential narrow groove 11 extends from one end portion 111e communicating with the terminal 92e at an inclination angle closer to the tread circumferential direction than to the direction of the intermittent sipe 9 extending in the orientation intersecting the tread width direction, and terminates in the other end portion 112e. According to the above configuration, when water flow from the start end 91e side toward a terminal 92e side is generated in the intermittent sipe 9 in response to rolling of the tire, water flows into the circumferential narrow groove 11, collides with the other end portion 112e of the circumferential narrow groove 11, and flows backward to a circumferential groove 3c side. Water flow toward the intermittent sipe 9 and the recess 7 side can be promoted, and the drainage performance can be further efficiently improved.

Also, since the circumferential narrow groove 11 is provided from the circumferential groove 3c through the intermittent sipe 9, air column resonance generated from the circumferential groove 3c is dispersed to the circumferential narrow groove 11, and noise of the tire can be reduced.

Figure 4:
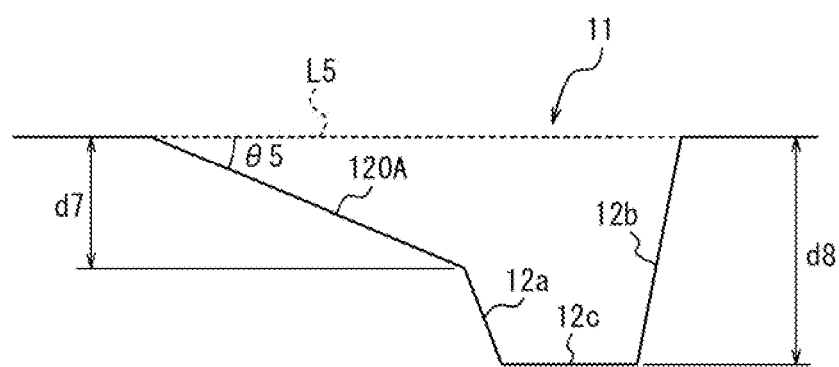
FIG. 4 is a view illustrating a cross section along line IV-IV of FIG. 1.

Note that the circumferential narrow groove 11 may have any shape, and has a shape defined by side walls 12a and 12b extending substantially along the tire radial direction and including a groove bottom 12c between the side walls 12a and 12b in FIG. 4. The side wall 12b has a shape extending to the surface of the land portion 4d, and the side wall 12a is continuous with the surface of the land portion 4d via an inclined wall 120A. The inclined wall 120A has a shape inclined from the surface of the land portion 4d to an inner side in the tire radial direction, i.e., toward the groove bottom 12c. According to the above configuration, inflow of water from the intermittent sipe 9 and the inclined surface of the intermittent sipe 9 can be promoted. Further, water collides with the other end portion 112e of the circumferential narrow groove 11, and flow of water flowing backward to the circumferential groove 3c side is also promoted.

Note that in the surface of the land portion 4d, there are not any special restrictions on an angle θ5 formed by a tangent L5 in a boundary between the surface of the land portion 4d and the inclined wall 120A, and the inclined wall 120A, and it is preferable that the angle is 5° or more and 50° or less from a viewpoint of continuity with the inclined surface 10E adjacent to the intermittent sipe 9. Also, the angle θ5 may be a constant angle from a side of the one end portion 111e to a side of the other end portion 112e of the circumferential narrow groove 11, or an angle that changes, for example, gradually decreases or gradually increases.

It is also preferable that a depth d7 of the inclined wall 120A of the circumferential narrow groove 11 is similar to a depth of the inclined surface 10E. According to the above configuration, it is easy to continuously control the flow of water between the inclined surface adjacent to the intermittent sipe 9 and the circumferential narrow groove 11. It is further preferable that a maximum depth d8 of the circumferential narrow groove 11 is similar to the groove depth d4 of the intermittent sipe 9.

Also, as illustrated in FIG. 1, it is preferable to provide a lateral groove 13 in the land portion 4a on the one end side. The lateral groove 13 has a shape including a start end 131e on the extension line ml of the intermittent sipe 9 and extending away from the recess 7 in the orientation intersecting the width direction of the tread. In the illustrated example, the intermittent sipe 9, the side wall 7b of the recess 7 and the start end 131e are intermittently provided. According to the above configuration, when a large amount of water is present on the road surface, for example, when water flows from the intermittent sipe 9 through the recess 7 onto the land portion 4a, water does not stay on the surface of the land portion 4a, and flows into the lateral groove 13, and hence, the drainage performance can be further improved.

Note that from a viewpoint of allowing water to smoothly flow along water flow from the intermittent sipe 9 into the lateral groove 13, the lateral groove 13 preferably has both the start end 131e and a terminal 132e located on the extension line ml.

It is also preferable that a distance r1 between the recess 7 and the lateral groove 13 in the tread width direction is smaller than the maximum length w10 of the recess 7 in the tread width direction. The lateral groove 13 is disposed at the distance smaller than the maximum length w10 of the recess 7, so that water flowing out of the recess 7 can flow into the lateral groove 13 without being oriented in various directions on the surface of the land portion 4a.

The lateral groove 13 may have any shape, and preferably has a shape with a groove width gradually increasing from a tire equator CL side toward a tread edge TE1 side, and then gradually decreasing from the vicinity of the tread edge TE1 as illustrated in the drawing. According to the above configuration, flow of water from inside to outside the tread surface 2 can be promoted to further improve the drainage performance, and decrease in rigidity in the vicinity of the tread edge TE1 can be inhibited.

Also, a groove 14 may be disposed between two lateral grooves 13 adjacent to each other in the circumferential direction. In the illustrated example, the groove 14 has a shape including a lateral groove portion 14a and a narrow groove portion 14b. The lateral groove portion 14a extends from a start end in the land portion 4a in the orientation intersecting the tread width direction, and opens in the tread edge TEL The narrow groove portion 14b extends outward from the tread edge TE1 in the tread width direction, bends substantially in the tread circumferential direction and extends in an orientation to form an acute angle with the lateral groove portion 14a.

Thus, the groove 14 is provided, so that the discharge of water to the tread edge TE1 side can be promoted, and the drainage performance of the tire 1 can be further improved.

Further, as illustrated in FIG. 1, there may be provided, in the land portion 4d, a narrow groove 15 that opens in the circumferential groove 3d, extends in an orientation intersecting the tread width direction, and terminates in the land portion 4d. In the illustrated example, since the circumferential narrow groove 11 terminates in the land portion 4d, drainage performance on a tread edge TE2 side of the circumferential narrow groove 11 can be further improved. The narrow groove 15 may have any shape such as a shape including a sipe and an inclined surface toward the sipe or a shape of a groove including a plurality of surfaces.

Also, there are not any special restrictions on a configuration of the land portion 5, and as illustrated in FIG. 1, there may be disposed a width direction groove 16 extending from a start end in the land portion 5 beyond the tread edge TE2 to an outer side substantially in the tread width direction. The width direction groove 16 can promote the discharge of water to the tread edge TE2 side, and can further improve the drainage performance of the tire 1.

Note that there are not any special restrictions on a mounting direction of the tire 1 to the vehicle, and it is preferable to mount the tire so that the tread edge TE1 side is an outer side in the mounting direction. That is, when the tire rolls, water taken into the grooves and sipes in the tread surface 2 tends to flow from an inner side to the outer side in the mounting direction, and a water discharge function can be more efficiently exerted for water flow from the intermittent sipe 9 toward the recess 7.

Here, when the tread edge TE1 side is the outer side in the mounting direction, it is preferable that the groove width w20 and groove depth d10 of the circumferential groove 3a are smaller than the groove width and groove depth of each of the circumferential grooves 3b, 3c and 3d. In a cornering situation or the like of the vehicle, a ground contact pressure on the outer side in the tire mounting direction tends to be higher than that on the inner side in the mounting direction. Therefore, the rigidity of the tread surface 2 can be strengthened by relatively decreasing the groove width and groove depth of the circumferential groove 3 disposed on the outer side in the mounting direction.

For example, the groove width w20 of the circumferential groove 3a may be from 10% to 50% of the groove width of each of the circumferential grooves 3b, 3c and 3d, and the groove depth d10 of the circumferential groove 3a may be from 50% to 100% of the groove depth of each of the circumferential grooves 3b, 3c and 3d.

REFERENCE SIGNS LIST 1 tire
2 tread surface
3a, 3b, 3c, 3d circumferential groove
4a, 4b, 4c, 4d, 5 land portion
7 recess
7a, 7b side wall
8A, 8B inclined surface
9 intermittent sipe
9a, 9b, 9c small sipe
91e start end
92e terminal
10A, 10B, 10C, 10D, 10E, 10F inclined surface
11 circumferential narrow groove
111e one end portion
112e the other end portion
12a, 12b side wall
12c groove bottom
120A inclined wall
13 lateral groove
14 groove
131e start end
132e terminal
14a lateral groove portion
14b narrow groove portion
15 narrow groove
16 width direction groove
TE1, TE2 tread edge
CL tire equator

The invention claimed is:

1. A tire comprising:
in a surface of a tread of the tire, a land portion row in which four land portions each defined by circumferential grooves extending in a circumferential direction of the tread or by a circumferential groove and a tread edge are arranged in parallel in a width direction of the tread;

in a land portion on one end side of the land portion row, a recess that opens in the circumferential groove on an adjacent land portion side; and an intermittent sipe extending in an orientation intersecting the width direction of the tread, intermittently by being interrupted by the circumferential groove, from a position of a start end corresponding to the recess, across three land portions of the four land portions excluding the land portion on the one end side, wherein the intermittent sipe opens in a surface of each of the three land portions via an inclined surface from the surface of each of the three land portions toward the intermittent sipe, wherein the recess has a substantially V-shape defined by two side walls extending away from each other from an interior of the land portion on the one end side toward the circumferential groove, wherein each of the two side walls defining the recess includes an inclined surface from a surface of the land portion on the one end side toward a bottom portion of the circumferential groove, wherein a maximum length of the inclined surface of the each of the two side walls in the circumferential direction of the tread is from 25% to 150% of a maximum length of the recess in the circumferential direction of the tread, and wherein a depth of the recess is similar to a depth of the circumferential groove.

2. The tire according to claim 1, wherein at least a part of the side wall defining the recess is present on an extension line of the intermittent sipe.

3. The tire according to claim 1, wherein the intermittent sipe terminates in a land portion on an other end side of the land portion row.

4. The tire according to claim 3, further comprising, in the land portion on the other end side, a circumferential narrow groove extending from a terminal of the intermittent sipe, closer to the circumferential direction of the tread than to a direction of the intermittent sipe, and terminating in the land portion on the other end side.

5. The tire according to claim 4, wherein the circumferential narrow groove includes an inclined wall inclined from a surface of the land portion on the other end side toward an inner side in a radial direction of the tire.

6. The tire according to claim 2, further comprising, in the land portion on the one end side, a lateral groove extending in an orientation intersecting the width direction of the tread, from a start end on the extension line of the intermittent sipe, separately from the recess.

7. The tire according to claim 6, wherein a distance between the recess and the lateral groove in the width direction of the tread is smaller than a maximum width of the recess in the width direction of the tread.

8. The tire according to claim 2, wherein the intermittent sipe terminates in a land portion on an other end side of the land portion row.

9. The tire according to claim 8, further comprising, in the land portion on the other end side, a circumferential narrow groove extending from a terminal of the intermittent sipe, closer to the circumferential direction of the tread than to a direction of the intermittent sipe, and terminating in the land portion on the other end side.

10. The tire according to claim 9, wherein the circumferential narrow groove includes an inclined wall inclined from a surface of the land portion on the other end side toward an inner side in a radial direction of the tire.

\* \* \* \* \*